Patented July 14, 1925.

1,545,571

UNITED STATES PATENT OFFICE.

WILLIAM M. POWERS, OF ST. PAUL, MINNESOTA, ASSIGNOR OF ONE-HALF TO MERCHANT & KILGORE, A FIRM COMPOSED OF FRANK D. MERCHANT AND HARRY D. KILGORE, OF MINNEAPOLIS, MINNESOTA.

SWEEPING COMPOUND.

No Drawing. Application filed June 6, 1923. Serial No. 643,772.

*To all whom it may concern:*

Be it known that I, WILLIAM M. POWERS, a citizen of the United States, residing at St. Paul, in the county of Ramsey, and State of Minnesota, have invented certain new and useful Improvements in Sweeping Compounds; and I do hereby declare the following to be a full, clear, and exact description of the invention, such as will enable others skilled in the art to which it appertains to make and use the same.

My invention has for its object to produce an improved sweeping compound, one of the main ingredients of which is sisal hemp tailings from cordage factories which, heretofore, has been an absolute waste, usually disposed of by burning. As is well known, next to manila hemp, sisal hemp produces the finest cordage, and to give it the same appearance as manila hemp, the same is not only dyed but odorized during the process of manufacture into cordage.

Sisal hemp, during the process of manufacture into cordage, is treated with a mineral oil to prevent the same from breaking, and to cause it to travel smoothly through the various stages of machining. This oil also acts as a preservative for the cordage against vermin. At the time sisal hemp tailings are removed from a cordage factory, substantially twenty-five per cent thereof is oil put in during the process of manufacturing cordage.

The ingredients for my improved sweeping compound are sisal hemp tailings, sand, mineral oil, and coloring. The proportions of these ingredients may be varied, but I have obtained a highly satisfactory and efficient sweeping compound by the use of said ingredients in the following proportions, towit:

| | Pounds. |
|---|---|
| Sisal hemp tailings | 450 |
| Sand | 1,600 |
| Mineral oil (12 gallons) | 90 |
| Coloring | 2 |

Sisal hemp tailings also includes a natural oil which greatly increases the efficiency of the sweeping compound and reduces the amount of oil required to be put into the sweeping compound during the manufacture thereof. The oil in the sweeping compound prevents the same from drying out or freezing.

What I claim is:

1. A sweeping compound containing sisal hemp tailings, sand and mineral oil.

2. A sweeping compound containing sisal hemp tailings, sand, mineral oil, and coloring.

3. A sweeping compound containing sisal hemp tailings, sand and mineral oil approximately in the following proportions:

| | Pounds. |
|---|---|
| Sisal hemp tailings | 450 |
| Sand | 1,600 |
| Mineral oil | 90 |

4. A sweeping compound containing sisal hemp tailings, sand, mineral oil and coloring, approximately in the following proportions:

| | Pounds. |
|---|---|
| Sisal hemp tailings | 450 |
| Sand | 1,600 |
| Mineral oil | 90 |
| Coloring | 2 |

5. A sweeping compound including an abrasive substance and a cordage factory waste by-product in the nature of hemp tailings containing mineral oil.

In testimony whereof I affix my signature.

WILLIAM M. POWERS.